July 14, 1931. R. L. CAIRNCROSS ET AL 1,814,544
WRENCH OF YIELDING AND ADJUSTABLE STRUCTURE
Filed Feb. 13, 1928 2 Sheets-Sheet 2
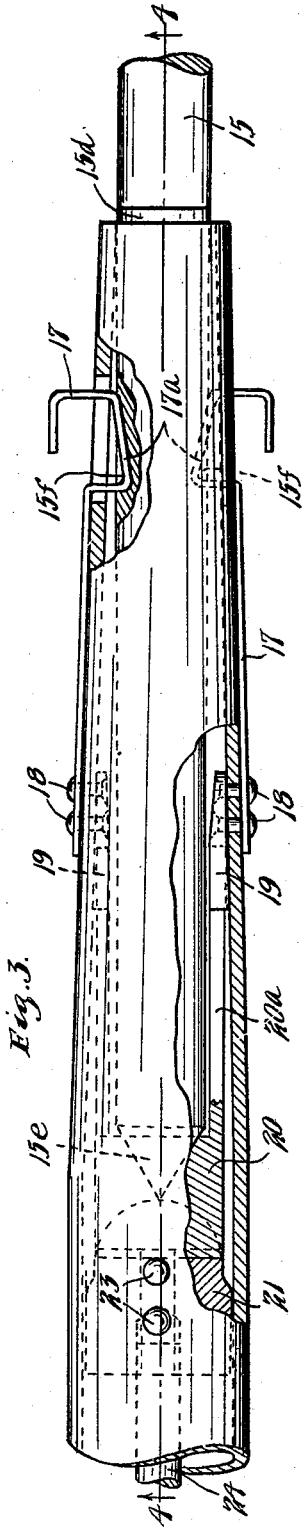
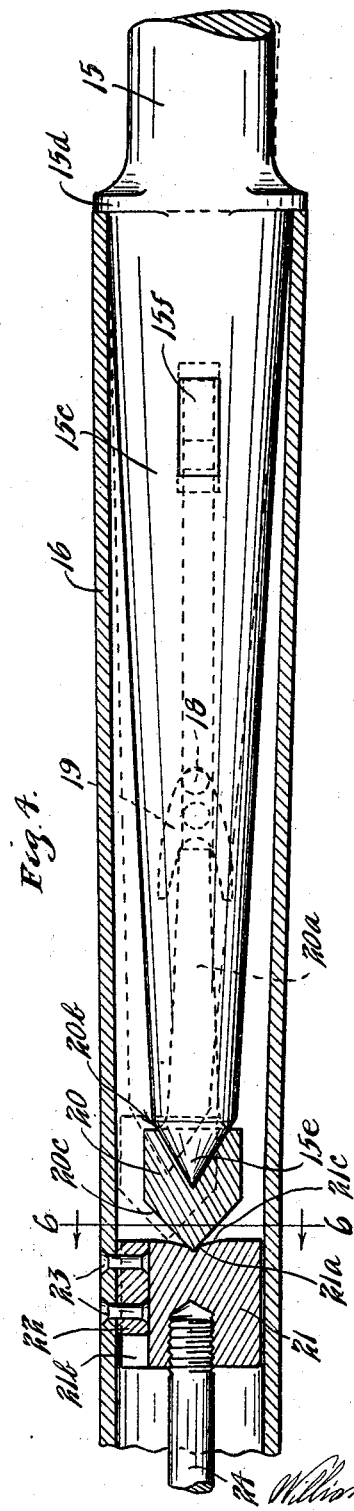
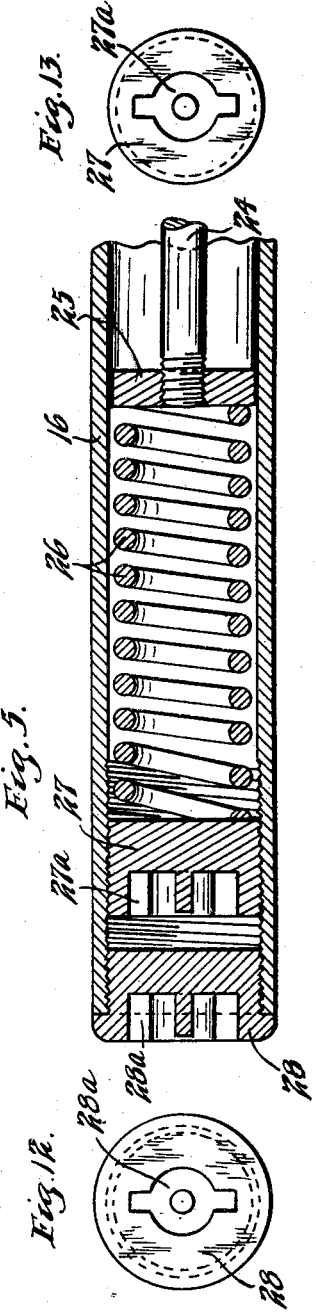
INVENTORS.
ROBERT L. CAIRNCROSS
GEORGE H. GOODELL.
BY THEIR ATTORNEYS.

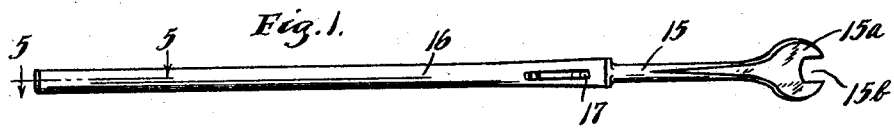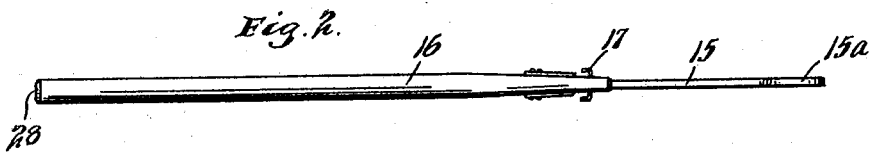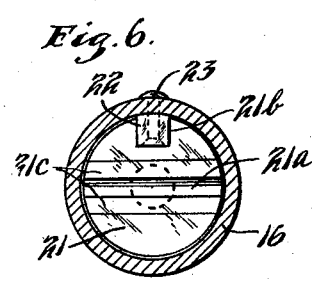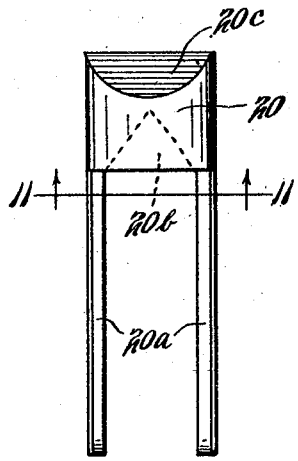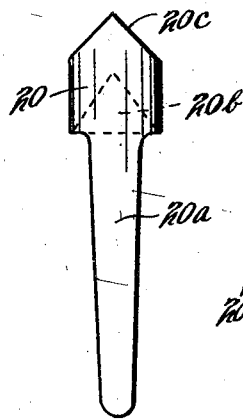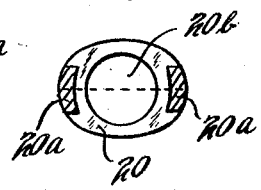

Patented July 14, 1931

1,814,544

UNITED STATES PATENT OFFICE

ROBERT L. CAIRNCROSS, OF CHICAGO, ILLINOIS, AND GEORGE H. GOODELL, OF ST. PAUL, MINNESOTA, ASSIGNORS, BY DIRECT AND MESNE ASSIGNMENTS, TO THE NATIONAL LOCK WASHER COMPANY, OF NEWARK, NEW JERSEY, A CORPORATION OF NEW JERSEY

WRENCH OF YIELDING AND ADJUSTABLE STRUCTURE

Application filed February 13, 1928. Serial No. 253,936.

This invention relates to a lever for effecting turning movement of an object such as a wrench used to turn and tighten nuts. While the invention is applicable for turning any desired object or nut, it particularly is designed for tightening the nuts on the bolts used in assembling railway rails, which pass through the angle bars and rails and secure the same together. The railroads of this country are being continually forced to effect further economy in the handling of traffic and it has become necessary to not alone increase the weight of both locomotives and cars but to move trains of all classes, including freight trains, at much higher speed than was heretofore thought possible. This increase in weight and speed has developed the necessity of building tracks with heavier rails and stronger fastenings. Certain engineers, responsible for track maintenance, now recognize and appreciate the importance of the fact that the weakest feature in the track joint structure today, is the variation in the intensity of the tension in the bolts used to unite the track joints. It is impossible for a man to tighten nuts so that the same degree of tension is developed in all of them. The bolts are thus tightened under different tensions and the bolts having the greatest tension therein are forced to withstand the impacts of traffic, until, under this tension, they stretch or elongate, or until sufficient wear of contact surfaces between the parts of the rail joint occurs to relieve the most highly tensioned bolt and transfer some of the load to the bolts which at first did not bear their share of the load, until a condition exists in which all of the bolts in the joint are stressed to substantially the same extent.

The expansion and contraction of rails produces an irresistible force and makes the difference in tension in track bolts a very important factor for the reason that it is frequently the case that one end of the joint, and less often both ends, are so firmly bolted as to be "frozen" or rigid to the extent that the motion of expansion and contraction is forced to take place and concentrated in joints other than the "frozen" or rigid ones, so that these movements are not uniformly distributed over all the joints but are concentrated in a smaller number than the total number of joints.

Some railroads, in an endeavor to have the bolts uniformly tightened, have provided wrenches of different lengths, proportioned to the size of the bolt with which they are to be used. This practice is uneconomical, and men who use the wrenches are often forced to overexertion in order to properly tighten the bolts.

Another feature in having the bolts unequally tightened, is that the work is often done by men varying a great deal in stature and strength. It will readily be seen that a taller and stronger man will naturally tighten the bolts to a greater extent than a smaller man. Workmen also vary a great deal and even men of the same physical proportions will not tighten bolts to the same degree.

It is an object of this invention, therefore, to provide a device by means of which the nuts can be tightened to a determined degree and which will indicate when the nuts are so tightened.

It is further object of the invention to provide a turning lever or wrench comprising two or more connected parts so constructed as to function as an integral member when subjected to turning or bending moments of less than a predetermined magnitude, said parts being arranged to move relatively to each other when the turning or bending movement of said magnitude has been reached.

It is a further object of the invention to provide a wrench having a nut engaging portion and a handle in which said portion is mounted for rocking movement, said handle having means engaging said portion and holding the same in rigid relation to said handle, said means being operated to move when a predetermined stress occurs between said portion and handle to cause relative movement of the same.

It is still another object of the invention to provide a turning lever or wrench comprising a member with means at one end adapted to engage an object to be turned, a handle for said member, means engaging said member to hold the same and said handle in rigid relation until a certain stress occurs between the same, when said means will permit relative movement of said member and handle and means for varying the degree of stress at which said member and handle will be moved.

It is more specifically an object of the invention to provide a wrench comprising a bar having means at one end engaging a nut, a handle into which said bar extends and in which it is rockably mounted, a member within the handle resiliently engaging the end of said bar to hold the same and said handle in rigid relation and to permit relative movement thereof when a predetermined stress occurs between the same, and means for varying the pressure of said resilient means on said bar to vary the stress when relative movement will occur between said bar and handle.

These and other objects and advantages of the invention will be fully set forth in the following description made in connection with the accompanying drawings, in which like reference characters refer to similar parts throughout the several views and in which:—

Fig. 1 is a view in side elevation of the wrench;

Fig. 2 is an end view of the device;

Fig. 3 is a partial view similar to Fig. 2, with certain portions broken away and others shown in vertical section;

Fig. 4 is a vertical section taken on line 4—4 of Fig. 3 as indicated by the arrows;

Fig. 5 is a vertical section taken on line 5—5 of Fig. 1 as indicated by the arrows;

Fig. 6 is a vertical section on line 6—6 of Fig. 4 as indicated by the arrows;

Fig. 7 is a plan view of the supporting bracket used;

Fig. 8 is an edge view of the bracket shown in Fig. 7;

Fig. 9 is a side view of the supporting yoke used in the device;

Fig. 10 is an edge view of the device shown in Fig. 9;

Fig. 11 is a horizontal section taken on line 11—11 of Fig. 9, as indicated by the arrows;

Fig. 12 is an end view of a handle cap member used; and

Fig. 13 is an end view of the adjusting block used.

Referring to the drawings, a bar 15 is shown, comprising a wrench such as a well known form of track wrench having a head 15a and a notch 15b adapted to receive the nut to be turned. The bar or wrench 15 has a tapered shank 15c at one end, extending to a shoulder forming flange 15d, the end 15e of said tapered portion 15c being of conical shape. The bar 15 and the shank 15c are of greater width than thickness, so as to be substantially elliptical in cross section. The shank 15c is received in the end of the tubular handle member 16 which is illustrated as cylindrical throughout its major portion, but which is somewhat flattened at one end so as to be substantially of elliptical form and substantially to fit the large end of the shank 15c. The shank 15c has slots 15f formed in opposite sides thereof adapted to be engaged when said shank is in the member 16, by spring members 17 secured to the sides of member 16 and having bent portions 17a adapted to engage in the slots 15f, the function of said spring members being to retain shank 15c within handle member 16. The members 17 are secured to the members 16 by the rivets 18 which also secure in place the small brackets 19 disposed against the inner sides of the member 16. The members 19 are shown in Figs. 7 and 8. It will be seen that each has a flaring notch 19a at its free end. A yoke member 20 is provided, adapted to be received in the member 16, which yoke member has spaced arms 20a having rounded ends adapted to be received respectively in the notches 19a of the members 19 as clearly shown in Figs. 3 and 4. The yoke 20 has a conical recess 20b in the head thereof, extending from between arms 20a into which extends the conical head 15e of shank 15c. The yoke 20 has the V-shaped or chisel shaped edge 20c and in the normal position of the wrench this edge is received in a transversely extending notch 21a of the block 21, which is substantially cylindrical in cross section and slidable within the member 16. The groove 21a is illustrated as V-shaped in cross section and the end surface of the block 21 shallow and slopes toward said groove for a short distance as shown at 21c. The block 21 has a groove or keyway 21b therein at one side, in which is disposed the key member 22 secured by rivets 23 to one side of the member 16. A rod 24 has one end threaded in the end of the block 21 opposite groove 21a and extends substantially centrally of the tube 16, being threaded at its other end into a follower plate 25 slidable in tube 16. The follower plate 25 is engaged at one side by one end of a coil compression spring 26 disposed in tube 16, the other end of which spring engages a block 27 threaded in the tube 16. The block 27 is provided at its outer end with a socket 27a adapted to receive a suitable wrench by means of which it can be turned and its position in member 16 varied. A cap 28 is threaded into the end of member 16, having a flange extending over said end, and said cap is also provided with a socket 28a in its outer end for receiving a wrench for turning said cap.

With the described structure, the wrench 15 will be inserted in the handle 16 as shown in full lines in Figs. 3 and 4. The block 27 will be positioned to exert suitable tension on the spring 26, which will in turn be transmitted to follower plate 25 and through rod 24 to the block 21. This block will thus be resiliently urged with considerable pressure against the end 20c of the yoke member 20, into which yoke member extends the end of the shank 15c. It will be seen that the yoke member 20 is mounted for rocking movement in members 19 about the ends of its arms 20a, and the shank 15c is also capable of rocking movement about the end of the member 16. With the parts so assembled and adjusted, the turning lever or wrench as shown in Figs. 1 and 2 will be applied to the nut and the nut turned by the swinging movement of said wrench. The member 15 and its shank 15c will be held in rigid relation with handle 16 until a certain stress occurs between members 15 and 16. When a certain stress occurs, the same will move the end of the shank 15c and the yoke 20 will be moved out of the groove 21a in the block 21 and said yoke and the end of the shank 15c will be moved to the position shown in dotted lines in Fig. 4. The yoke 20 and block 21 will be made of metal specially adapted to resist wear and these parts will be highly finished and polished and well greased with a durable grease so that they will function easily. The relative movement of the members 15 and 16 is very noticeable to the operator and when this movement occurs, the operator will know that the nut has been tightened to a sufficient degree. It will readily be seen that the block 27 can be adjusted as desired to vary the pressure or tension with which block 21 engages the end of yoke 20 to vary the degree of stress at which the relative movement will occur between members 15 and 16. The wrench can thus be adjusted for operating on nuts and bolts of different sizes and strengths. It will be seen that the relative movement between members 15 and 16 may take place in either direction. The wrench can thus have either side applied to the nut and it is not necessary to take the trouble to apply the wrench in one particular manner.

It will be seen that when the shank 15c is inserted in the handle 16, the springs 17 will snap into the grooves 15f and the shank will thus be kept from dropping from member 16. If it is desired to remove the member 15, the springs 17 can be separated by engaging the reversely bent ends thereof to move the same from slots 15f and release member 15, which can then be withdrawn or will drop out of member 16. The shoulder 15d limits the movement of the shank 15c into the member 16 so that there is no danger of said shank entering said member too far and in any way damaging or dislocating the parts in member 16. It will be seen that key 22 will prevent rotation of block 21. The sloping surfaces 21c function to automatically reset the wrench when the point of the yoke 20 is again moved into the notch 21a. It will be seen that these surfaces will guide said point so that it will slide and snap into the notch 21a. Without this slight incline, the mechanism would not readily adjust itself to the proper position and the operator would have to move the handle of the wrench back and forwards until he could feel or see that the same was in proper position with the yoke engaged in notch 21a.

From the above description it is seen that applicant has provided a very simple and efficient turning lever or wrench, by means of which a plurality of bolts can be tensioned to a uniform degree. When the desired tension is secured on the bolts, the parts of the wrench move relatively and the operator is at once notified that the nut and bolt are sufficiently tightened. It is thus unnecessary for the operator to exert any skill or exert any precautions to see that the nuts and bolts are uniformly tensioned. By the use of the device quite a few objectionable features at present experienced can be eliminated. First, a considerable waste of material caused by the breakage of the bolts which are intitially set up with the greatest tension; second, the dangerous condition which is often produced when sun kinks develop in the track because some of the track joints are too tightly connected or are frozen on account of some bolts being tightened too much; third, the waste of labor in having men often put more work on the tightening of the nuts than is necessary, resulting from the use of wrenches, the length of which is improperly determined. The use of the invention will also result in a greatly improved track joint. The various joints of the track will be uniformly tightened and expansion and contraction of the rails can take place uniformly in the various joints.

The lever or wrench can be made strong and is self-contained and the mechanism is all well protected within the handle where it will not be subject to abuse or the action of the weather. The device can be easily made of commonly used materials and is easily and quickly assembled. The device has been amply demonstrated in actual practice and it is found to be very successful and efficient.

It will, of course, be understood that various changes may be made in the form, details, arrangement and proportions of the parts, without departing from the scope of applicants' invention, which, generally stated, consists in a device capable of carrying out the objects above set forth, in the novel parts and combinations of parts disclosed and defined in the appended claims.

What is claimed is:—

1. A wrench having in combination, a bar having means at one end for engaging a nut, a tube constituting a handle in which one end of said bar is received and with respect to which it is relatively movable, a member engaging the inner end of said bar so as to be movable therewith, a block slidable in said tube having a shallow recess therein engaged by said last mentioned member, a spring in said tube urging said block against said member, and means engaging said spring and movable relatively to said tube for compressing the spring to vary the pressures on said block.

2. A wrench having in combination, a wrench element having means at one end for engaging a nut, a tube forming a handle in which one end of said wrench element is received, releasable means for detachably holding said wrench element in said tube, a yoke in said tube in which the inner end of said wrench element is disposed, means secured to the inner side of said tube in which said yoke is mounted for swinging movement, said yoke having a comparatively sharp edge at one end, a block in said tube having a shallow recess in which said edge is received, a spring urging said block against said yoke, and means for varying the pressure of said spring.

3. A wrench having in combination, a bar having means at one end for engaging a nut, a tube forming a handle for said wrench in which one end of said bar is received and is mounted for rocking movement, brackets secured to the inner side of said tube at opposite sides of said bar, a yoke having arms respectively received in said brackets for swinging movement therein, said yoke having a recess therein in which the inner end of said bar is disposed and having a chisel edge at its opposite end, a block having a shallow groove in which said chisel edge is received, a spring in said tube urging said block against said edge, and means for varying the adjustment of said spring.

4. The structure set forth in claim 3, said block having surfaces at each side of said recess sloping toward said groove whereby said chisel edge will be guided into said recess.

5. A wrench having in combination, a bar having means at one end for engaging a nut and having a shank at its other end with a shoulder some distance from the end thereof, a tube forming a handle for said wrench in which said shank is received, said shoulder abutting the end of said tube, a member engaging the end of said shank and movable with said end in said tube transversely of said tube, a block having a recess in one end disposed in said tube and adapted to receive the end of said member, and resilient means in said tube engaging said block whereby said block and member are yieldingly engaged and said block and shank may move and be separated from said block when sufficient stress occurs between said tube and bar.

6. The structure set forth in claim 5, said tube being substantially of elliptical cross section at the end engaged by said shoulder, and said shank substantially fitting said tube adjacent said shoulder.

7. A wrench of the class described including a handle member, a wrench element having a nut engaging portion and a shank portion detachably received in the handle member, and having a free fulcrum engagement therewith, and resilient means holding the handle member and the shank portion of the wrench element normally in predetermined relation but permitting relative lateral movement thereof when a predetermined stress therebetween is reached.

8. A wrench comprising a tubular handle, a member within said handle movable transversely thereof and held against longitudinal movement therein, a member longitudinally movable in said handle, one of said members having a recess therein and the other having a tapered portion normally disposed in said recess, resilient means urging said second mentioned member longitudinally of the handle against said first mentioned member, and an object engaging element inclusive of a shank having a free fulcrum engagement with and rockably disposed within said handle, said shank and said first mentioned member having interengaging formations.

9. In combination, a wrench having a nut engaging portion and a shank rigidly secured thereto, a handle engaging said shank and affording a free fulcrum engagement therewith, means normally holding said handle and shank in predetermined relation but permitting relative movement therebetween when a certain force is exerted on said handle, and means limiting said relative movement.

10. In combination, a wrench having a nut engaging portion and a tapered shank rigidly secured thereto, a tubular handle surrounding said shank and engaging the larger end thereof, means in the handle and movable longitudinally thereof and adapted to prevent lateral movement of the small end of said shank, and a spring urging said means towards said shank and adapted to yield to permit said lateral movement upon exertion of a predetermined force upon said handle.

11. In combination, a wrench having a nut engaging portion and a tapered shank rigidly secured thereto, a tubular handle surrounding said shank and engaging the larger end thereof, means in the handle and movable longitudinally thereof and adapted to prevent lateral movement of the small end of said shank, a spring urging said means towards said shank and adapted to yield to permit said lateral movement upon exertion of a predetermined force upon said handle, and means for detachably securing said shank within said handle.

12. In combination, a wrench having a nut engaging portion and a tapered shank rigidly secured thereto, a tubular handle surrounding said shank and engaging the larger end thereof, a member within the handle engaging the end of the shank and laterally movable therewith, a block movable lengthwise of the handle and engaging said member, a spring urging said block towards said member, and coacting means on said member and block normally preventing lateral movement therebetween and held in engagement by said spring but adapted to permit such lateral movement when a sufficient force is exerted upon said handle, to overcome the action of said spring.

13. In combination, a wrench having a nut engaging portion and a tapered shank rigidly secured thereto, a tubular handle surrounding said shank and engaging the larger end thereof, a member within the handle engaging the end of the shank and laterally movable therewith, a block movable lengthwise of the handle and engaging said member, a spring urging said block towards said member, and coacting means on said member and block normally preventing lateral movement therebetween and held in engagement by said spring but adapted to permit such lateral movement when a sufficient force is exerted upon said handle, to overcome the action of said spring, said member then engaging the side of the tubular handle to limit said lateral movement and to give an audible indication thereof.

14. In combination, a wrench having a nut engaging portion and a tapered shank rigidly secured thereto, a tubular handle surrounding said shank and engaging the larger end thereof, a member within the handle engaging the end of the shank and laterally movable therewith, a block movable lengthwise of the handle and engaging said member, a spring urging said block towards said member, said block and member having the one an inclined surface and the other a portion in constant engagement therewith, whereby upon relative lateral movement between the block and member said spring will tend to return them to initial position.

15. In combination, a wrench having a nut engaging portion and a shank rigidly secured thereto, a handle engaging said shank and affording a free fulcrum engagement therewith, means normally holding said handle and shank in predetermined relation but permitting relative movement therebetween when a certain force is exerted on said handle, and means detachably securing said shank to said handle.

16. In combination, a wrench having a nut engaging portion and a tapered shank rigidly secured thereto, a tubular handle surrounding said shank and engaging the larger end thereof, means in the handle and movable longitudinally thereof and adapted to prevent lateral movement of the small end of said shank, a spring urging said means towards said shank and adapted to yield to permit said lateral movement upon exertion of a predetermined force upon said handle, and means on said shank adapted to engage the wall of said tubular handle to limit said lateral movement and to give an audible indication thereof.

17. In combination, a wrench having a nut engaging portion and a shank rigidly secured thereto, a hollow handle surrounding said shank and affording a free fulcrum engagement therewith and permitting movement of the shank in the handle laterally thereof, means in the handle movable longitudinally thereof and adapted to prevent said lateral movement of the shank, a spring urging said means towards said shank and adapted to yield to permit said lateral movement upon the exertion of a predetermined force upon said handle and means holding said shank in said handle.

18. In combination, a wrench having a nut engaging portion and a shank rigidly secured thereto, a hollow handle surrounding said shank and affording a free fulcrum engagement therewith and permitting movement of the shank in the handle laterally thereof, a member within the handle engaging the end of the shank and laterally movable therewith, a block movable lengthwise of the handle and engaging said member, a spring urging said block towards said member, and coacting means on said member and block normally preventing lateral movement therebetween and held in engagement by said spring, but adapted to permit such lateral movement when a sufficient force is exerted upon said handle to overcome the action of said spring.

In testimony whereof we affix our signatures.

ROBERT L. CAIRNCROSS.
GEORGE H. GOODELL.